United States Patent [19]

Chitwood

[11] 4,375,137
[45] Mar. 1, 1983

[54] FISHING LURE HOLDER
[75] Inventor: Ralph Chitwood, Nampa, Id.
[73] Assignees: Betty Louise C. Erberich, Caldwell; Wilbur T. Chitwood, Pocatello; Robert W. Chitwood, Caldwell, all of Id.
[21] Appl. No.: 216,848
[22] Filed: Dec. 16, 1980
[51] Int. Cl.³ .............................................. A01K 97/06
[52] U.S. Cl. ...................................... 43/57.1; 224/920
[58] Field of Search .............. 43/25.2, 54.5 R, 57.5 R; 24/255 R, 259 R; 206/476, 480, 481, 482, 483; 224/920, 921, 922

[56] References Cited
U.S. PATENT DOCUMENTS

| 513,044 | 1/1894 | Handlan | 43/54.5 R |
| 972,154 | 10/1910 | Brooke | 43/54.5 R |
| 2,849,825 | 9/1958 | Reisner | 43/25.2 R |
| 3,083,427 | 4/1963 | Grenon | 24/255 R |
| 3,199,243 | 8/1965 | Caston | 43/26 |

Primary Examiner—Nicholas P. Godici
Assistant Examiner—M. Jordan
Attorney, Agent, or Firm—Harvey B. Jacobson

[57] ABSTRACT

A fishing lure holder is specifically designed to retain trolling lures which are not in use and includes the use of a plurality of steel spring clips positioned on opposed sides of an elongated, flat aluminum plate. In this respect, the aluminum plate has one steel spring clip attached on one side by means of a rivet and washer arrangement, while two spring clips are attached to the other side of the plate, also through the use of rivets and washers. A small trolling lure may then be retained on the side of the aluminum plate having the single spring clip, while a larger trolling lure may be retained on the opposed side of the plate having the two spring clips.

6 Claims, 4 Drawing Figures

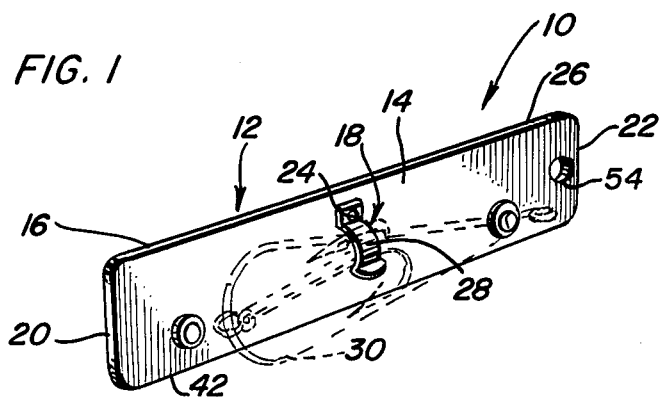
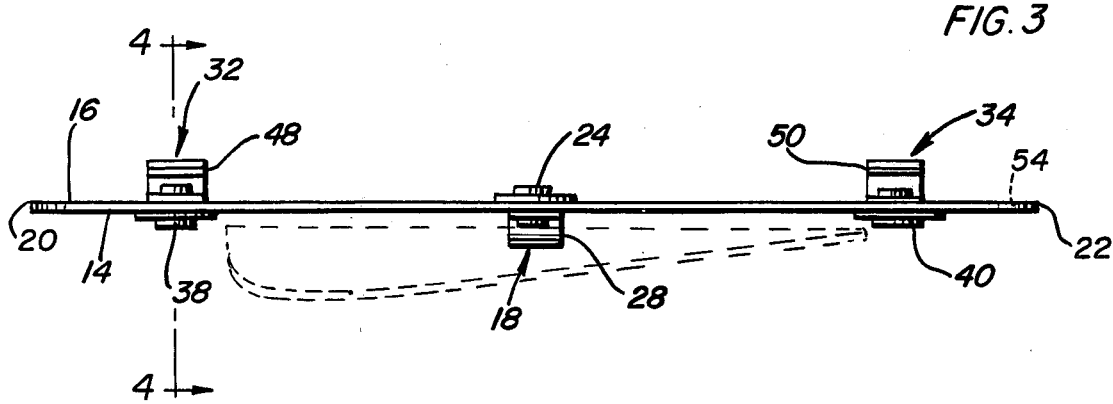
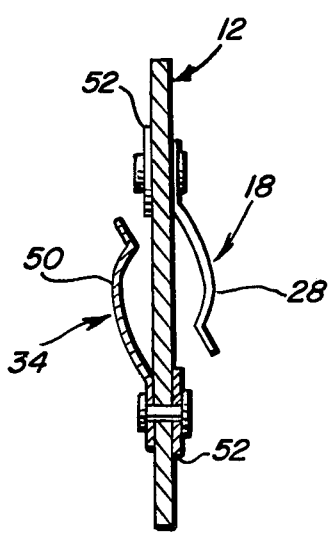
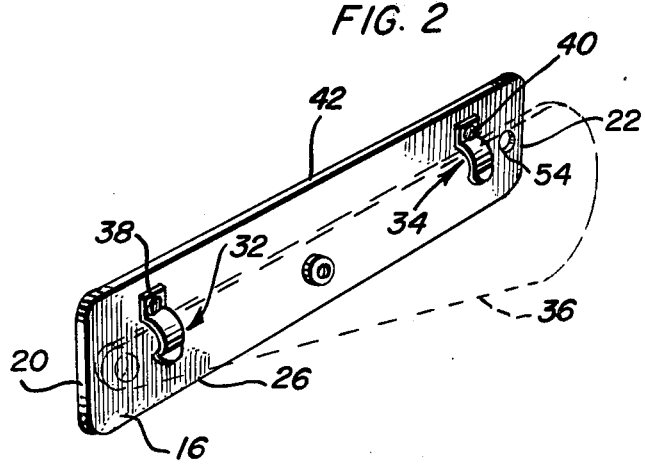

FISHING LURE HOLDER

BACKGROUND OF THE INVENTION

1. Field of the Invention

The present invention relates to fishing lure holders and more particularly pertains to trolling lure holders which are designed to retain such lures in a tackle box in a manner whereby entanglement with other fishing gear is prevented and which is further designed to hold at least two differently sized fishing lures.

2. Description of the Prior Art

Holders for fishing gear are generally well-known in the prior art. In this respect, fishing gear holders are typically large and bulky in size, and further quite frequently are designed to hold a plurality of fishing gear thereon to the extent that entanglement occurs among the fishing gear itself even though the same is retained on the holder. For example, U.S. Pat. No. 3,785,080, issued Jan. 15, 1974, to Wallace, illustrates a holder for fishing leaders which essentially consists of a flat rectangular, rigidly plastic panel with pairs of aligned notches in its opposite edges for winding and storing fishing leaders. The panel may be fabricated of any suitably rigid material which is not subject to damage due to water exposure and is otherwise durable when subjected to its intended use. By way of example the Wallace panel may be constructed of any one of a number of known clear or colored plastics. Rows of holes are formed in the panel, and slotted plugs can be placed over the leader ends and snapped into the holes to hold the leaders in place. In a modified form of the Wallace disclosure, a third set of notches is provided for holding hooks which might be secured on the ends of the leaders. As such, the Wallace fishing gear holder is representative of the complex construction often associated with prior art fishing gear holders, although not specifically limited to a retention of fishing lures. In this connection, the particular design of the Wallace fishing gear holder requires the use of fishing gear having leaders associated therewith, and is not particularly well suited for retaining trolling lures having no leaders attached thereto.

As to holders designed for retaining fishing lures per se, reference is made to U.S. Pat. No. 3,336,693, issued Aug. 22, 1967, to Lussier, wherein there is disclosed a tackle box in which fishing jigs and lures are independently suspended on a plurality of vertical slidably mounted carrier panels within the box. The box is further provided with side walls having tracks for receiving the panels, and the tracks are provided with upwardly facing shoulders whereby a panel may be raised and held in an elevated exposed position. Each panel is provided with a plurality of perforations, and hook-shaped brackets are selectively positionable within the perforations whereby the hook portion of a fishing lure may be hung on such brackets to effect a retention of the lure within the tackle box. However, the particular construction of the Lussier device still permits fishing lures to bounce around on their associated panels to the extent that they may become entangled with each other, as well as with other fishing gear contained within the tackle box. Further, the lure retention panels of Lussier are designed to hold a plurality of fishing lures on each of the respective sides thereof so that the lures easily come into contact with one another thus to further increase the entanglement problems.

To overcome the entanglement problems associated with lure holders, there has been at least a couple of lure holders developed which are designed to retain but one lure at a time. For example, U.S. Pat. No. 3,273,279, issued Sept. 20, 1966, to Norton et al., discloses a fishing lure holder which includes a base member and an elongated extension member orthogonally fixed thereto, such extension member having a resilient elastic strip attached on a free end thereof. The elastic strip is provided with a plurality of perforations into which a small hook member may be fixedly secured, whereby a fishing lure may have its hook portion brought into engagement with the base member, while the small hook attached to the elastic strip may be brought into the eye of the lure which is normally utilized for direct connection to a fishing line. While the construction of the Norton et al. device does permit the retention of a fishing lure thereon in a manner which substantially reduces the chances of entanglement of the lure with other fishing gear, the fishing lure holder is still deficient in design to the extent that it is useful for retaining only one lure at a time. Further, the construction thereof results in a fishing lure being retained in a parallel alignment and spaced apart relationship with the extension member whereby other fishing gear may become entangled by passing through the space between a retained lure and the extension member.

To illustrate a different approach, U.S. Pat. No. 3,395,788, issued Aug. 6, 1968, to Gill, discloses a lure container having a tension retained closure associated therewith. Specifically, the Gill container essentially consists of a pocket-size transparent envelope-type plastic container having a pouch therein into which artificial lures and bait may be positioned. Additionally, a closure portion of the container is designed to snap together so as to seal itself and further, the closure will spring open when squeezed. While this particular construction is successful in preventing entanglement between a fishing lure contained therein and other fishing gear contained within a tackle box, it can be appreciated that the design and construction thereof is both complex and expensive to manufacture. Further, the Gill container is essentially limited to the retention of a single lure, since if two or more lures were positioned within the container simultaneously, they would become entangled with each other thereby defeating the intended purpose of the device.

L. C. Warner, U. S. Pat. No. 2,663,114 discloses a fishing leader holder which includes the use of a pair of coil springs positioned at opposite ends of a plate, such springs serving as gripping means for the fishing leaders so as to retain the same on the plates. None of these patents disclose in combination all of the specific details of the present invention in such a way as to bear upon the patentability of any claims of the present invention.

Accordingly, it can be appreciated that there still exists a need for a simple fishing lure holder which may be economically manufactured and which may retain more than one fishing lure at a time without any fear of entanglement between respective lures contained on the holder. In this respect, the present invention fulfills this need.

SUMMARY OF THE INVENTION

The general purpose of the present invention, which will be subsequently described in greater detail, is to provide a fishing lure holder that has all the advantages of similarly employed prior art fishing lure holders and has none of the above-described disadvantages. To attain this, the present invention provides a unique fishing lure holder that is constructed from an elongated flat aluminum strip having steel spring clips positioned on opposed sides thereof. Specifically, a single steel spring clip is centrally positioned on one side of the aluminum plate and is retained thereon through the use of a rivet and washer arrangement, while two spring clips are positioned on the opposite side of the plate at respective ends thereof, also through the use of rivets and washers. Further, a hole is provided on one end of the aluminum plate whereby the same may be hung on a wall or similar structure. As such, a small trolling lure can be attached to the side of the aluminum plate having the single steel spring clip, while a longer and larger trolling lure may be attached to the side of the plate having the two steel spring clips.

It is therefore an object of the present invention to provide a fishing lure holder which has all of the advantages of priorly employed fishing lure holders and has none of the disadvantages.

It is another object of the present invention to provide a fishing lure holder which may be easily and economically manufactured.

It is a further object of the present invention to provide a fishing lure holder which may be utilized to retain at least two fishing lures without any fear of entanglement therebetween.

Still another object of the present invention is to provide a fishing lure holder which is specifically designed to retain trolling lures.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is perspective view of a fishing lure holder forming the present invention and illustrating in phantom fishing lures retained thereon.

FIG. 2 is a perspective view of the opposite side of the fishing lure holder illustrated in FIG. 1 and further illustrating in phantom a fishing lure retained thereon.

FIG. 3 is a top plan view of the fishing lure holder forming the present invention.

FIG. 4 is a transverse cross-sectional view of the fishing lure holder taken along the line 4—4 of FIG. 2.

DESCRIPTION OF THE PREFERRED EMBODIMENT

With reference now to the drawings and in particular to FIG. 1, a fishing lure holder employing the concept and principles of the present invention and generally designated by the reference numeral 10 will be described. In this respect, it can be seen that the fishing lure holder 10 comprises an elongated flat aluminum plate 12 having opposed faces or sides 14, 16 and further having a steel spring clip 18 fixedly secured to a central portion thereof. Specifically, the steel spring clip 18 is approximately centrally positioned from respective ends 20, 22 of the lure holder 10, while being attached to the plate 12 by a rivet 24 positioned proximate to a first longitudinal edge portion 26. As such, by attaching the spring clip 18 proximate to the first edge portion 26, a lure retaining portion 28 of the spring clip is centrally positioned over the plate 12 in a manner whereby a small trolling lure 30, as indicated in phantom lines, may be retained thereon in the manner illustrated.

The construction of the opposie side 16 of the aluminum plate 12 can be ascertained with reference to FIG. 2 wherein it can be seen that two spring clips 32, 34 are provided on the opposite side so that a longer trolling lure 36, as indicated in phantom, may be retained thereon. Further, it can be seen that each of the spring clips 32, 34 fixedly secured to the side 16 are similarly attached by respective rivets 38, 40 which are positioned proximate to a second longitudinal edge portion 42. Additionally, the spring clips 32, 34 are not centrally positioned on the plate 12, but rather are located proximate to respective ends 20, 22 thereby to facilitate the retention of the lure 36.

The specific positioning of spring clip 18 on the side 14 and the spring clips 32, 34 on the side 16 of the plate 12 can be more clearly ascertained with reference to FIG. 3 of the drawings. In this regard, the central positioning of the spring clip 18 is clearly illustrated, whereby the same is positioned approximately half way between the respective ends 20, 22, while the spring clips 32, 34 are clearly illustrated as lying proximate to the respective ends 20, 22 thereby to present a symmetrical balanced construction in the design of the fishing lure holder 10. Further, it can be seen that each of the spring clips 18, 32 and 34 have their respective lure retaining portions 28, 48, 50 extending outwardly from the respective sides 14, 16 of the plate 12 so as to facilitate an attachment of fishing lures thereto, while at the same time the spring clips 18, 32, 34 do not extend outwardly to such a distance as to increase the problems associated with entanglement with other fishing gear. Further, it can be seen that the rivets 24, 38 and 40 are all secured to the plate 12 in a manner whereby only a minimal extension therefrom occurs so as to further lessen problems associated with entanglement.

Proximate at least one of the ends 20, 22 there is a hole or aperture 54 provided whereby the holder 10 may be hung on a wall or similar structure having a nail or the like (not shown) for securably mounting the holder for storage, display and other uses.

Lastly, with reference to FIG. 4 of the drawings, it can be seen that it is envisioned to utilize washers 52 with each of the respective spring clips 18, 32 and 34. In this respect, the washers 52 serve to provide for a good attachment between the rivets 24, 38, 40 and the aluminum plate 12, while at the time allowing for rivets of a standard length to be utilized in the construction thereof. In this connection, it can be seen that the spring clips 18, 32, 34 present an aperture in a steel portion thereof for engagement with the rivets 24, 38, 40 on one side of the plate, while the washers 52 present a steel portion for engagement with the other ends of the respective rivets on the opposite side of the plate. This construction then compensates for the soft and malleable structure of the aluminum associated with the plate 12 whereby a secure and permanent attachment of the respective spring clips 18, 32, 34 to the aluminum plate can be assured. Further, FIG. 4 illustrates the specific construction of the spring clip lure retaining portions 28, 48 and 50. In this connection, it can be seen that the lure retaining portions 28, 48, 50 essentially consist of an upwardly arched portion having downwardly turned free ends, and further having an upwardly turned lip on the free ends to facilitate the positioning of a fishing lure 30, 36 thereunder in a manner whereby the respective spring-type lure retaining portions serve to hold the lures in secure abutment against the aluminum plate 12. While the plate 12 is described as an aluminum panel or plate, it is within the purview of the present invention that the panel or plate 12 may be of rigid plastic, such as disclosed in Wallace, supra, which is incorporated herein by reference.

While a preferred embodiment of the present invention has been described with reference to the drawings, it is to be understood that the optimum dimensional relationships of the parts of the invention are deemed readily apparent and obvious to one skilled in the art and all equivalent relationships to those illustrated in the drawings and described in the specification are intended to be encompassed by the invention, subject only to limitations specifically appearing in the claims.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A fishing lure holder comprising: elongated generally rectangular flat plate means against which a fishing lure may be securely retained, the plate means having opposed substantially planar sides throughout, clip means fixedly secured to a central portion of one side of the plate means, and further clip means fixedly secured proximate end portions of the opposite side of the plate means, said clip means and further clip means providing spring-biased retention and being fixedly secured to said plate means and serving to retain said fishing lure against said plate means, all of said clip means paralleling the short edges of the plate means with the central clip means opening in an opposite direction to the end clip means.

2. The fishing lure holder as defined in claim 1 wherein each of said clip means are retained on said flat plate means through the use of rivets and washers.

3. The fishing lure holder as defined in claim 7 wherein each of said clip means includes a lure retaining portion of an arched construction and further includes an upwardly extending lip to facilitate the positioning of a fishing lure in a retaining abutment therewith.

4. The fishing lure holder as defined in claim 1 wherein said plate means is constructed of aluminum and said clip means are constructed of steel.

5. The invention of claim 3 wherein the plate means is provided with an aperture extending through the body of the plate means proximate an end thereof and wherein the holder is capable of being hung from nail means extending from a support surface and passing through the apertue of the plate means.

6. The invention of claim 5 wherein each of the clip means is constructed and arranged so the clip means secured to the central portion is adaptable to retain small trolling lure elements and the further clip means secured proximate end portions is adaptable to retain large trolling lure elements, said washers and rivets being disposed adjacent the respective long edges of the plate means and the lips being disposed adjacent the opposite long edges of the plate means.

* * * * *